(12) United States Patent
Milovanovic et al.

(10) Patent No.: US 7,140,016 B2
(45) Date of Patent: Nov. 21, 2006

(54) MEDIA ACCELERATOR QUALITY OF SERVICE

(75) Inventors: Rajko Milovanovic, Plano, TX (US); Philip R. Thrift, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 665 days.

(21) Appl. No.: 09/994,948

(22) Filed: Nov. 27, 2001

(65) Prior Publication Data
US 2002/0112097 A1 Aug. 15, 2002

Related U.S. Application Data

(60) Provisional application No. 60/253,848, filed on Nov. 29, 2000.

(51) Int. Cl.
*G06F 9/46* (2006.01)
*G06F 15/16* (2006.01)

(52) U.S. Cl. ........................................ 718/100; 709/231

(58) Field of Classification Search .................. 718/1, 718/100–108; 379/908; 709/231
See application file for complete search history.

(56) References Cited

U.S. PATENT DOCUMENTS

| 6,092,120 | A | * | 7/2000 | Swaminathan et al. | ..... 709/247 |
| 2001/0018673 | A1 | * | 8/2001 | Goldband et al. | ............ 705/27 |
| 2003/0018966 | A1 | * | 1/2003 | Cook et al. | ..................... 725/2 |

OTHER PUBLICATIONS

Silberschatz, Abraham, and Galvin, Peter Baer, Operating System Concepts, 1999, John Wiley & Sons, Inc., Fifth Edition, p. 125.*

* cited by examiner

*Primary Examiner*—Meng-Al T. An
*Assistant Examiner*—Kenneth Tang
(74) *Attorney, Agent, or Firm*—Carlton H. Hoel; W. James Brady; Frederick J. Telecky, Jr.

(57) ABSTRACT

Integration of DSP running algorithms with general purpose processor running applications including plugin objects as proxies for the DSP algorithms and with quality of service including application controls of algorithm scheduling and algorithm events reported to the applications.

4 Claims, 13 Drawing Sheets

$t_{sa}$ = LAST POSSIBLE TIME FOR PROCESS A
TO START AND STILL MAKES ITS DEADLINE $t_{sd}$ = LAST POSSIBLE TIME FOR PROCESS D
TO START AND STILL MAKE ITS DEADLINE $t_{sa}$ = LAST POSSIBLE TIME FOR PROCESS A
TO START AND STILL MAKES ITS DEADLINE $t_{sd}$ = LAST POSSIBLE TIME FOR PROCESS D
TO START AND STILL MAKE ITS DEADLINE

FIG. 8
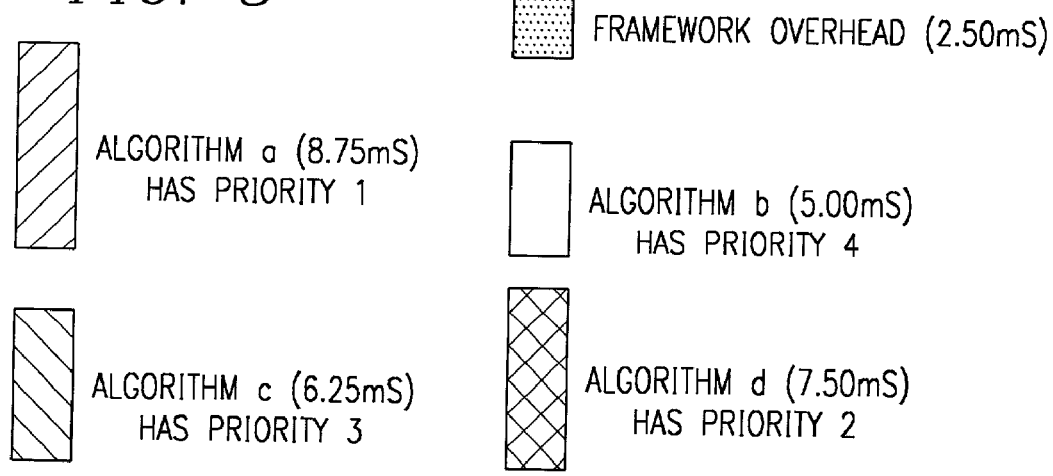
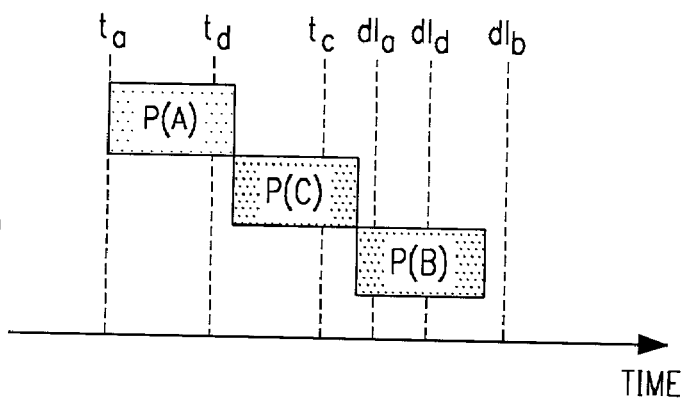
FIG. 9
$t_i$ = TIME STAMP ARRIVAL OF EACH DATA FRAME FOR THE RESPECTIVE PROCESS
$dl_i$ = DEADLINE FOR FINISHING PROCESSING OF EACH RECEIVED DATA FRAME
$P()$ = PREDICTION OF PROCESSING TIME FOR EACH RECEIVED DATA FRAME

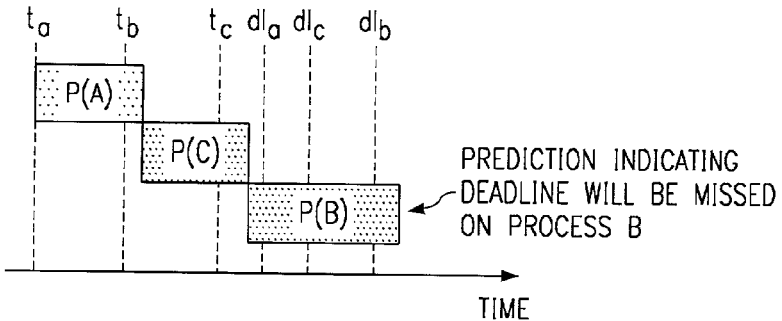

FIG. 10

PREDICTION INDICATING DEADLINE WILL BE MISSED ON PROCESS B $t_i$ = TIME STAMP ARRIVAL OF EACH DATA FRAME FOR THE RESPECTIVE PROCESS
$dl_i$ = DEADLINE FOR FINISHING PROCESSING OF EACH RECEIVED DATA FRAME
$P()$ = PREDICTION OF PROCESSING TIME FOR EACH RECEIVED DATA FRAME

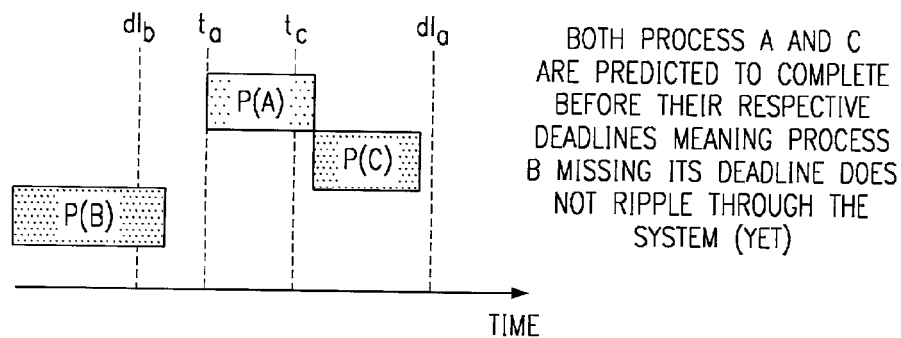

BOTH PROCESS A AND C ARE PREDICTED TO COMPLETE BEFORE THEIR RESPECTIVE DEADLINES MEANING PROCESS B MISSING ITS DEADLINE DOES NOT RIPPLE THROUGH THE SYSTEM (YET)

$t_i$ = TIME STAMP ARRIVAL OF EACH DATA FRAME FOR THE RESPECTIVE PROCESS
$dl_i$ = DEADLINE FOR FINISHING PROCESSING OF EACH RECEIVED DATA FRAME
$P()$ = PREDICTION OF PROCESSING TIME FOR EACH RECEIVED DATA FRAME

FIG. 11

$t_i$ = TIME STAMP ARRIVAL OF EACH DATA FRAME FOR THE RESPECTIVE PROCESS $dl_i$ = DEADLINE FOR FINISHING PROCESSING OF EACH RECEIVED DATA FRAME $P()$ = PREDICTION OF PROCESSING TIME FOR EACH RECEIVED DATA FRAME

······· ARRIVAL OF BUFFER B1
--- ARRIVAL OF BUFFER B2
—— ARRIVAL OF BUFFER B3

| STACK REQUIREMENTS | PERSISTENT MEMORY REQUIREMENTS | PERSISTENT READ ONLY MEMORY REQUIREMENTS | NON-PERSISTENT MEMORY REQUIREMENTS |

ALGORITHM WORKSPACE COMPONENTS TO TRANSFER IN PRIOR TO ALGORITHM EXECUTION IF ALGORITHM REQUIRES CONSTANT TABLES (CONTEXT SWITCH IN ONLY)

*FIG. 18*

| STACK REQUIREMENTS | PERSISTENT MEMORY REQUIREMENTS | PERSISTENT READ ONLY MEMORY REQUIREMENTS | NON-PERSISTENT MEMORY REQUIREMENTS |

READ ONLY PERSISTENT MEMORY DOES NOT NEED TO BE TRANSFERRED OUT ON CONTEXT SWITCH. THEREFORE ALGORITHM PAGE CHANGE-OUT IS MORE EFFICIENT.

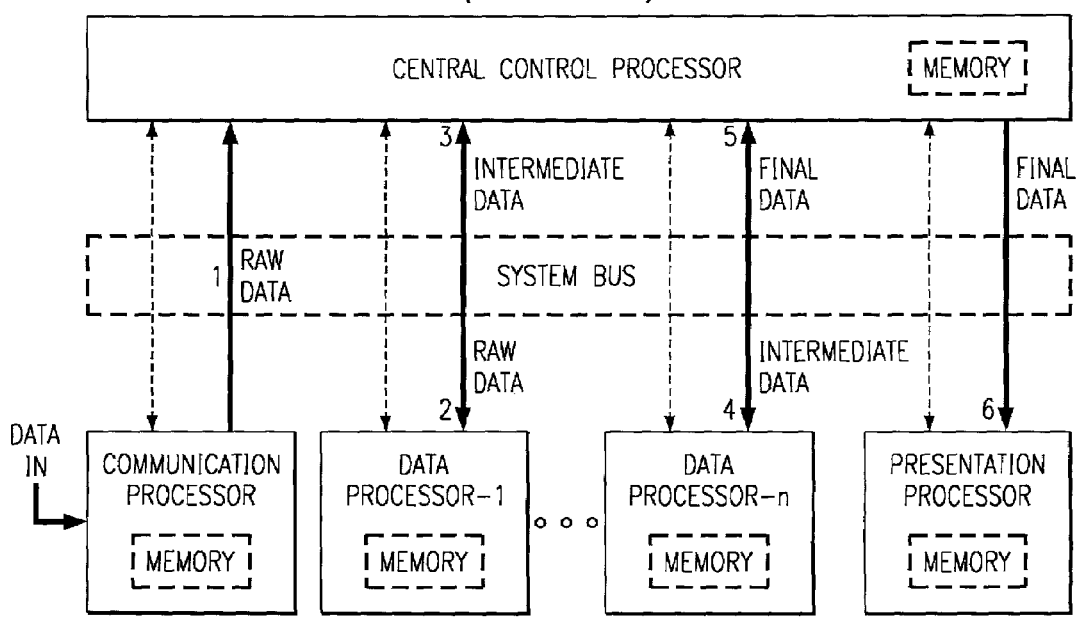

MEDIA ACCELERATOR QUALITY OF SERVICE

RELATED APPLICATIONS

This application claims priority from provisional application Ser. No. 60/253,848, filed Nov. 29, 2000, now abandoned. The following patent application discloses related subject matter: Ser. No. 09/841,847, filed Apr. 25, 2001. These applications have a common assignee with the present application.

BACKGROUND OF THE INVENTION

1. Field of the invention

The invention relates to electronic devices, and, more particularly, to multiprocessor and digital signal processor frameworks and methods.

2. Background

The growth of the Internet coupled with high-speed network access has thrust real-time multimedia processing into the computing mainstream. Indeed, the proposed MPEG-21 standardization of multimedia framework architecture considers seven architectural elements: digital item definition, multimedia content representation, digital item identification and description, content management and usage, intellectual property management and protection, terminals and networks, and event reporting. Applications of such a architecture could be in creation of a photo album distributed over the computers of widely dispersed family members with connections over the Internet and with editing facilities or could be consumption of Internet streaming video with related simultaneous additional content available which needs resolution of quality of service (QoS) and terminal and network resources available issues prior to consumption.

MPEG-21 proposal standard interfaces aim to shield users from network and terminal installation, management, and implementation issues. Such architecture could include a global QoS manager in each terminal which controls terminal resource and prediction managers and interacts through APIs with a user plus with network resource and prediction managers; see FIG. 25 and FIG. 24 for general network architecture.

The need for a QoS manager within a terminal/network node (client/server) stems specifically from real-time service requirements of all streaming-media based applications. Streaming media applications have to deal with heterogeneous codecs (encoders/decoders) and filters with unique rendering deadlines. These applications should also be able to exploit and translate human perceptual characteristics to graceful degradations in the quality of service. They should be able to handle reasonable amounts of jitter in their processing and rendering cycles. For instance, in video applications, the frame rate for rendering has to be maintained at 30 frames/sec (fps), which translates to a frame period of 33 ms. The application, however, should be capable of withstanding limited instantaneous variations as negotiated with the server. Also, at 30 fps, human visual perception can withstand frame drops of about 6 frames/sec. The client application should again be capable of supporting a graceful degradation in performance (instantaneous dropping of frames) and maintain a steady-state of rendering within specific tolerances negotiated with the server. A QoS manager is the mechanism that provides the necessary functions and capabilities to realize such a real-time system.

Microsoft DirectShow provides an application framework on a general purpose processor for playback of multimedia streams from local files or Internet servers and for capture of multimedia streams from devices. DirectShow revolves about a filter graph made of pluggable filter components with a filter graph manager controlling the connection of filters and the stream's data flow through the filters. Applications control the filter graph by communication with the filter graph manager; see FIG. 26. Playback from an Internet simply requires the source filter be capable of reading from an Internet URL. A parser filter after the source filter can perform the parsing into audio, video, text, etc. streams; see FIG. 27. The filter graph manager controls and also searches for needed filters (e.g., renderer) in a registry with merit values for selection. The filters have pins for filter input/output. FGM supports media stream starting, pausing, duration of play, . . . by application/ActiveX controls calls to the filter graph manager which accesses methods of the filters, and the filter graph manager posts events from the filters to the application.

A filter is a COM object for performing a task; and a pin is a COM object created by a filter for unidirectional data stream to/from the filter; see FIG. 28. A filter has IBaseFilter interface which enumerates the pins, properties, et cetera and inherits from IMediaFilter which allow control of state processing such as running, pausing, and stopping, plus synchronization; called by FGM. Pin interface supports transfer of time-stamped data using shared memory or other resources, negotiate data formats at pin-to-pin connections, buffer management/allocation to minimize data copying and maximize data throughput. IQualityControl interface on output pins.

Data flow in filter graphs (protocols), including quality control data, originates in the renderer and flows upstream (or to QCM) through the filters until it finds a filter capable of media data flow change. For example, media sample protocol: how media samples are allocated and passed between filters. Quality management protocol how filter graph adapts dynamically to hardware and network conditions to degrade/improve performance gracefully.

Media sample data flow by either push or pull: source filter push by call IMemInputPin::Receive from the downstream filter, or downstream pull by IAsyncReader interface (IAsyncReader Transport). Media samples are data objects which support IMediaSample interface. Data from one filter to another is called "transport", and there is support for local memory transport in DirectShow classes: input pin supports IMemInputPin interface and output pin. The IAsyncReader interface is for pull.

Notenboom U.S. Pat. No. 5,748,468 and Equator Technologies PCT published application WO 99/12097 each describes methods of allocating processor resources to multiple tasks. Notenboom considers a host processor plus coprocessor with tasks allocated to coprocessor resources according to a priority system. Equator Technologies schedules processor resources according to task time consumption with each task presenting at least one service level (processor resource consumption rate) supported, and the resource manager admits a task if sufficient resources for a supported service level exist.

Systems with two or more processors, each processor with its own operating system or BIOS, include systems with widely separated processors connected via the Internet and also systems with two or more processors integrated on the same semiconductor die, such as a RISC CPU plus one or more DSPs.

The XDAIS standard prescribes interfaces for algorithms which run on DSPs; this provides reusable objects. XDAIS requires an algorithm implement the standard interface IALG plus an extension for running the algorithm. XDAIS also requires compliance with certain flexibility rules such as relocatable code and naming conventions. A client application can manage an instance of the algorithm by calling into a table of function pointers. With the XDAIS standard/ guidelines the algorithm developer is able to develop or convert an algorithm so that it is easier to plug into a DSP application.

FIG. 20 shows a diagram of how data flows through the processing elements of current heterogeneous systems. The data transactions are numbered 1 through 6 to show time ordering. For each transaction data must pass through the system bus under control of the Central Control Processor (CCP). The CCP initiates transactions by sending messages or triggers via the control paths to the various processing elements in the system.

Processing elements in FIG. 20 are shown as separate processors (e.g. DSPs, ASICs, GPPs, etc.) capable of running a defined set of tasks. That is why each is shown with its own memory. Processing elements can also be individual tasks running on the same processor.

In some cases, the same data must pass through the system bus multiple times (e.g. transactions 1 and 2, 3 and 4, and 5 and 6). In such systems data must pass through the system bus a total of 2+(2×n) times, or in this case 6 times. Each pass through the system bus and intervention by the CCP introduces data flow overhead and reduces overall system throughput.

Data flow overhead negatively impacts how much data can move through the system in a given time frame and thereby restricts the amount of data the system is capable of processing. Such a system would likely be performing fewer useful tasks than the sum of capabilities of its elements might otherwise indicate.

SUMMARY OF THE INVENTION

The present invention provides a real-time platform with quality of service (QoS) control for integrating general purpose processor streaming media applications and/or media players with DSP media algorithms.

This has advantages including simplifying client application programming for applications on a system including DSPs and which make use of DSP algorithms.

BRIEF DESCRIPTION OF THE DRAWINGS

The drawings are heuristic for clarity.

FIGS. 3–13a–13b are timing diagrams for QoS.

FIGS. 14–19 show preferred embodiment memory analysis.

FIG. 20 shows known data flow in a heterogeneous system.

DESCRIPTION OF THE PREFERRED EMBODIMENTS

1. Overview

The preferred embodiments (iDSP) provide real-time platforms with quality of service (QoS) control for integrating general purpose processor (GPP) streaming media applications and/or media players with DSP media algorithms such as codecs, transforms, renderers, capturers, sources, and sinks.

IDSP provides (1) a media-domain framework that is compliant with the XDAIS algorithm standard, (2) processing and management of multiple, concurrent media streams, and (3) real-time media processing with guaranteed in-box QoS and MPEG-21 compliance. GPP applications include DirectShow applications with various filters replaced by iDSP plugins and corresponding iDSP components on an integrated DSP.

Figure 1A:
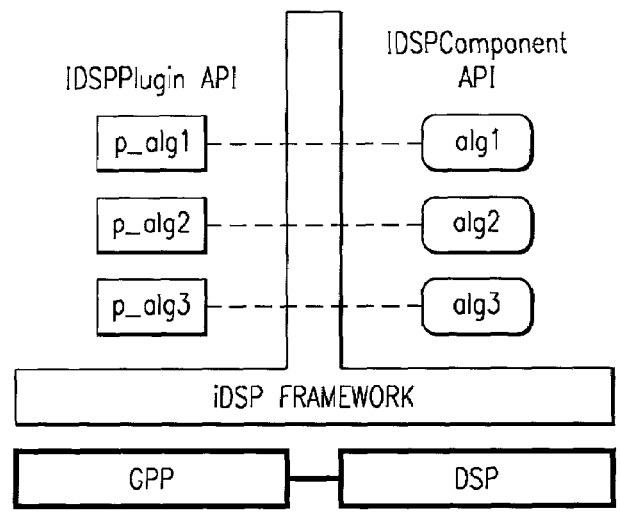
FIGS. 1a–1c show a preferred embodiment iDSP architecture.
Figure 1B:
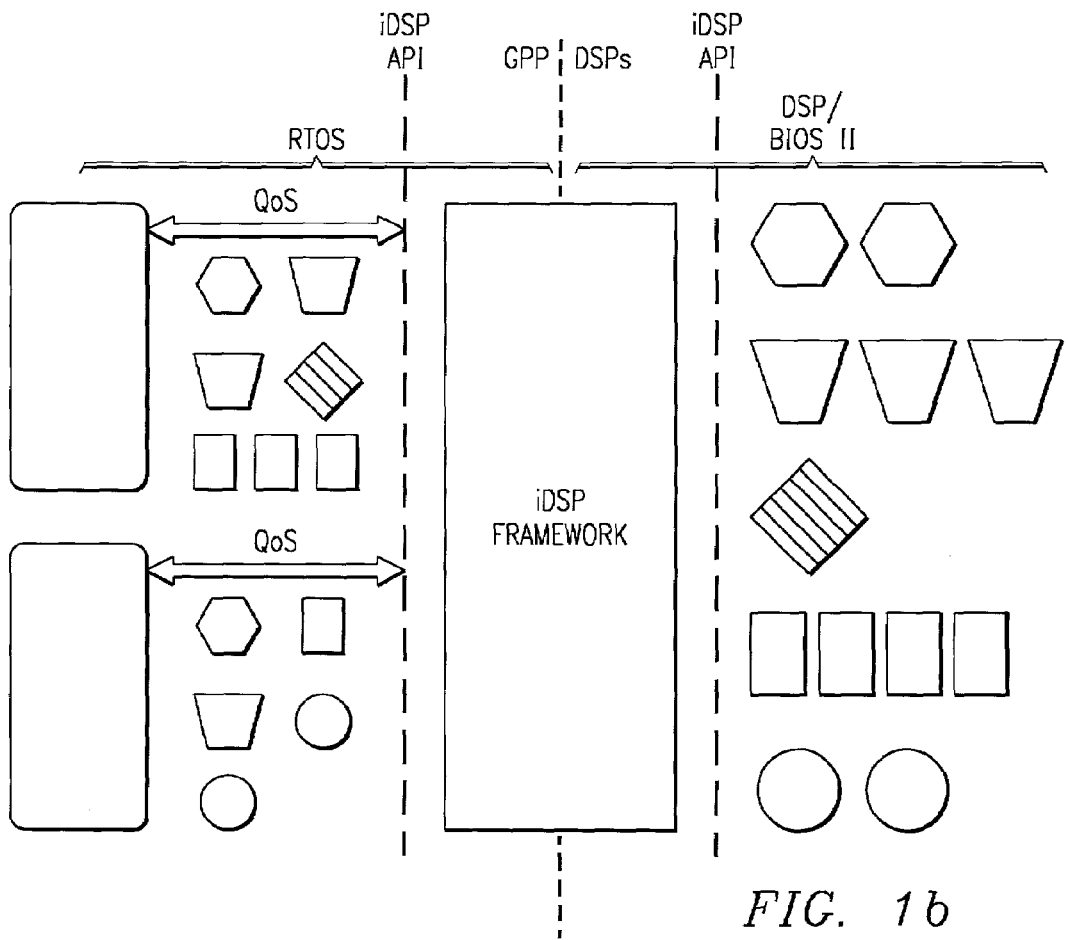
Figure 1C:
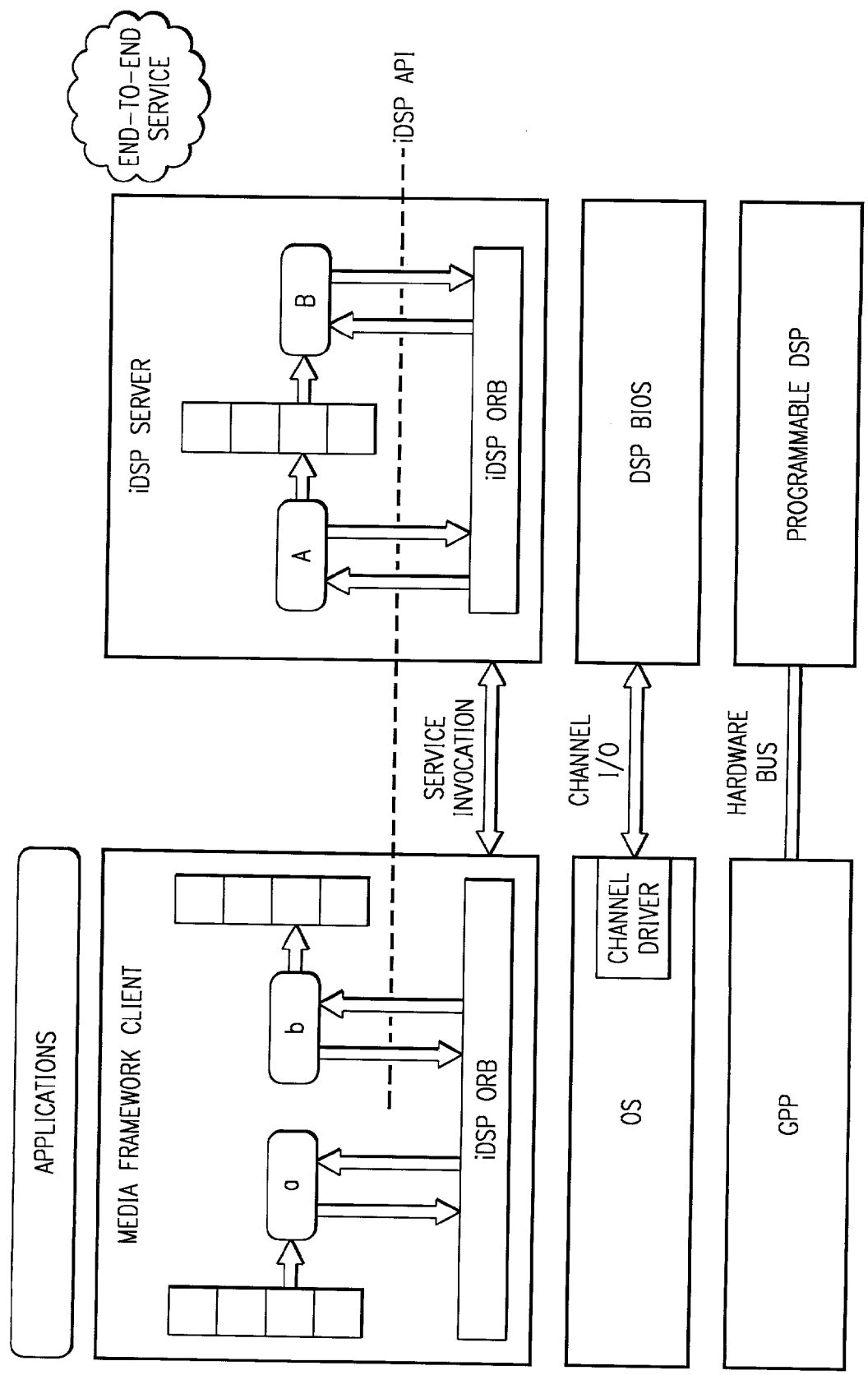

FIGS. 1a–1c schematically illustrates the iDSP framework integrating DSP algorithms alg1, . . . alg3 (iDSP components) into a GPP media application through corresponding GPP proxy objects p_alg1, . . . p_alg3 (iDSP plugins) on a hardware platform including a RISC processor (GPP) bridged to a DSP with the GPP running a real-time OS (RTOS). The framework has an API for application developers and an API for algorithm developers. The iDSP Programmer's Guide in the Appendix provides details on the APIs plus an example of a DirectShow application with iDSP acceleration of G.723 audio decoding.

2. Quality of Service Design

Figure 2A:
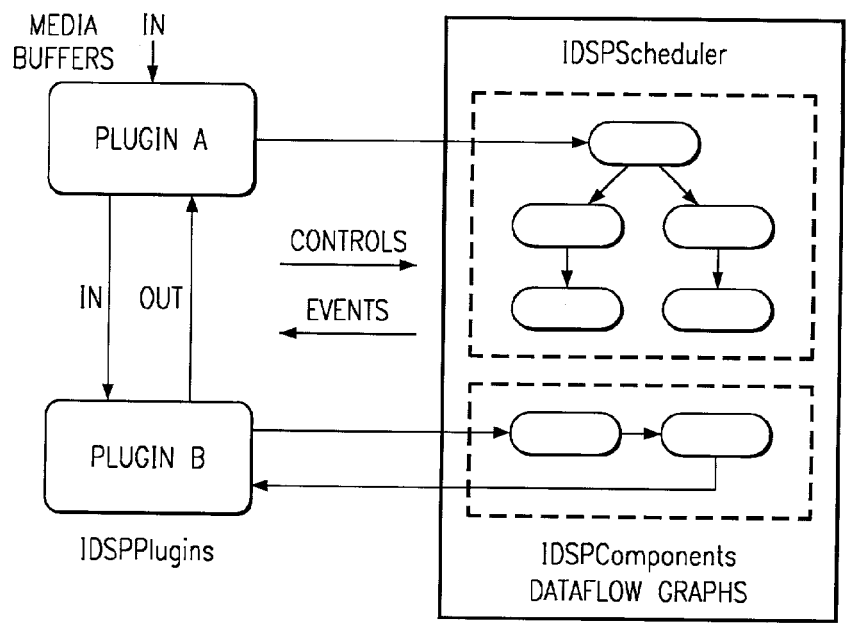
FIGS. 2a–2b illustrate preferred embodiment quality of service.
Figure 2B:
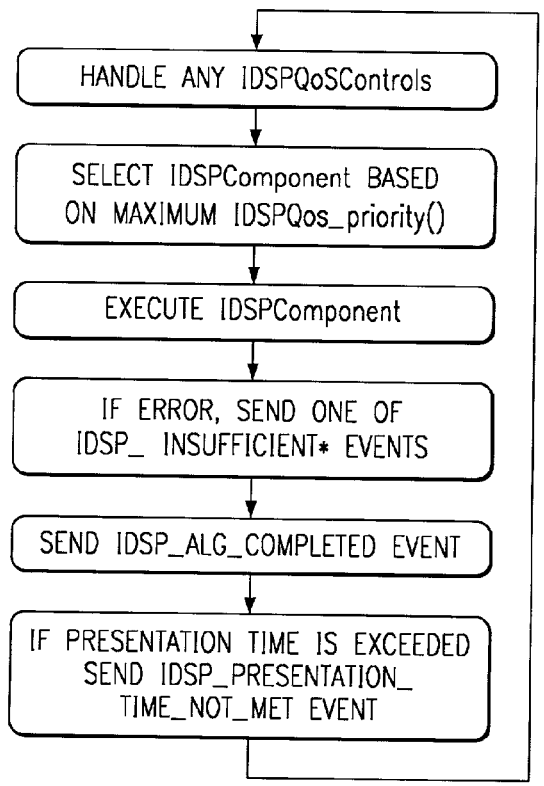

FIGS. 2a–2b schematically illustrate the preferred embodiment iDSP framework and scheduler with FIG. 2a showing data and control flow between plugins in the GPP application and corresponding data graphs of algorithms on the DSP. Indeed, the dataflow graph for pluginA has five algorithms in two tracks and that for pluginB has two algorithms and data return. FIG. 2b shows execution of the iDSP scheduler which includes algorithm priority analysis. QoS support in the iDSP framework includes event notifications sent from the scheduler to the plugins and control from the plugins to the scheduler so that the application using the plugins can impact the QoS. In particular, An IDSPPlugin is the application interface to a dataflow (directed acyclic) graph of one or more IDSPComponents.

An IDSPPlugin is created by specifying a set of input and output IDSPFormat types.

The data I/O interface to IDSPPlugin is the time-stamped issue/reclaim model: media buffers from the application using IDSPPlugins are stamped with a presentation time.

Arrows show data flow of IDSPBuffers (time-stamped media buffers) between IDSPPlugins and IDSPComponents and between IDSPComponents.

IDSPBuffers are time-stamped (with IDSPTimes).

The IDSPScheduler optimizes on-time execution of IDSPComponents to maintain on-time (synchronized) presentation (audio and video) of media.

IDSPQoSEvents are received asynchronously by IDSPPlugins. The types are:

IDSPQoS_ALG_COMPLETED
IDSPQoS_PRESENTATION_TIME_NOT_MET
IDSPQoS_INSUFFICIENT_DATA
IDSPQoS_INSUFFICIENT_CYCLES_AVAILABLE
IDSPQoS_INSUFFICIENT_MEMORY_AVAILABLE

IDSPQosControls are sent by IDSPPlugins. The types are:
  IDSPQoS_SET_RATE
  IDSPQoS_SET_QUALITY_LEVEL
  IDSPQoS_GET_STATS (memory utilized, cycles utilized, quality level, rate, percent of buffers meeting deadline, quality level needed for meeting deadline).

The IDSPScheduler provides QoS scheduling and event notification:
  IDSPQoS_priority( ) is computed based on the time-criticality to meet prsentation deadline. If the highest priority component cannot be rum, the IDSPScheduler analyzes the environment and sends an IDSPQoSEvent. The application can adjust the quality level or the rate.

More generally, QoS is supported in iDSP in the following interfaces described in the iDSP Programmer's Guide in the Appendix:
  IDSPPlugin_issue( ),
  IDSPPlugin_reclaim( ),
  IDSPPlugin_getPerformance( ),
  IDSPPlugin_optimize( ),
  IDSPPluginManager_getMemoryUtil( ),
  IDSPPluginManager_getProcessorUtil( ),
  IDSPCommand( ),
  IDSPRateChangeCommand( )

Indeed, the key to QoS is "on time" rendering, and iDSP includes support for QoS management for application programmers by:
providing access to runtime data measuring the earliness/lateness of media buffers along the dataflow chain.
providing an interface to components for adjusting QoS—which can be extended to new capabilities required by a specific media player
providing access to a component's memory and processor utilization
providing a runtime scheduler that optimizes the "on-time" behavior of time-based media The media application developer can use these iDSP features to build QoS into the application, interfacing with a media player's specific QoS management.

All data streams in iDSP are time-based: IDSPPlugin_issue( ) and IDSPPlugin_reclaim( ) provide, in addition to data transfer, time I/O information that can be used to measure earliness and lateness in processing throughout the dataflow graph. An application can use this data to obtain a measure of performance and determine adjustments needed to adjust media processing. The iDSP scheduler optimizes the dataflow to avoid lateness. IDSPPlugin_optimize( ) can be used to reduce the frame rate for a plugin so that lateness is minimized. IDSPPlugin_getPerformance( ) provides a measure of how "on time" the plugin is doing.

IDSPCommand is the base type for all IDSPComponent commands, including QoS commands. IDSPRateChangeCommand is a type that is provided by iDSP 2.0. IDSPComponents that handle this command will adjust their frame rate accordingly. Application developers will extend IDSPCommand for QoS commands required by their player development.

IDSPPluginManager_getMemoryUtil( ) and IDSPPluginManager_getProcessorUtil( ) are used to determine the load on the system of a plugin. This can be used by the application to see whether a new player can be constructed at all. It is also used by the iDSP load balancer in managing component allocations to multiple processors.

3. Core Properties of MPEG-21 Compliant QoS Management in iDSP.
In the following "OEM sw" denotes all software the box builder has integrated (from own and 3rd party sources) with iDSP (assumed to include DSP/BIOS II) software.
iDSP Services Available to OEM Software include the following media service requests which can be issued to iDSP:
1. Plug—embed new iDSP media service inside OEM software on GPP side
2. Play—feed media into a plugged iDSP service
3. Connect—two existing (aggregate or simple) iDSP media services into an aggregate one
4. QoS—(A) inquire, (B) set, and (C) be alerted about (an aspect of) iDSP QoS during Plug, Play, and Connect.
QoS Features
1. OEM Software can in principle inquire about any aspect of iDSP QoS
2. OEM Software can in principle set any aspect of iDSP QoS
3. OEM Software can in principle be alerted about any aspect of iDSP QoS
4. QoS fully conforms to all relevant-for-iDSP MPEG-21 terminal QoS requirements and to a sensible subset (maybe empty) of its network QoS requirements—both as much as they are currently articulated by MPEG-21.
5. With version II of DSP/BIOS, available classes of iDSP services on a given DSP are fixed at DSP code image load time (=reset time for all DSP services). When DSP/BIOS adds DLL capability, available classes of iDSP services will be changeable while DSP performs its services.
6. iDSP manages QoS towards OEM software "by exception": "All's as expected by OEM software—and thus doesn't bother OEM software—unless (a) specifically tells the opposite or (b) fails to notify periodically (period settable by OEM software) that all's well.
7. All media streamed digital items are strongly typed. This prevents hooking up wrong iDSP components or services—with OEM software or among themselves.
8. All media frames are real-time stamped. iDSP guarantees timely media processing.
9. Actual frame processing time is available to OEM sw for all current and several past frames for all active streamed digital items.
10. iDSP can vary media frame rate—as instructed by the OEM sw, or proactively as a part of graceful degradation.
11. When resources get close to depletion, if now OEM software QoS instructions, iDSP on its own starts graceful degradation of service.
12. iDSP component can not stall/block iDSP services longer than is the variance for the agreed level of semantic load for the stream it is a part of. The moment it exceeds this threshold, iDSP kills it and notifies OEM software. If iDSP (and not OEM software) is rendering, it will substitute another active or default streamed digital item in the place of the killed one; substitution priorities will have been initially agreed with OEM software when that particular OEM software invoked iDSP first time, and could have been modified by OEM software at any time past that (for example, at ea new streamed digital item start/stop, or during streamed digital item/s/).
13. When Plugging, before starting Play, OEM sets the expected average load and variance for that (set of) media streamed digital item(s).
14. iDSP alerts OEM software if inter-(last few)frames load variance is above the set one, and suggests options to handling the increased load. (NOTE—steady larger or just a peak may be known by OEM software)
15. iDSP is optimized for maximal media value add throughput for a given DSP processing capacity, by iDSP framework dynamically managing the ratio of DSP compute time versus DSP-GPP communications time, to best fit the disparity in DSP's internal vs. external memory access performance.
16. Atomic semantic unit of transfer to/from OEM software is a media frame.
17. iDSP schedules the sum of current media services, including management of latencies, inter-frame variations, inter-streamed digital item cross-loading.
18. Conflict between multiple pieces of OEM software is not possible: All potential conflicting requests by two or more such entities are resolved by iDSP in a pre-defined deterministic manner.
19. Master iDSP media service load balancing is done on GPP, and distributed iDSP scheduling on each DSP.
20. iDSP supports one GPP with multiple DSPs.
21. With DSP/BIOS II the whole image for a given DSP is loaded in one go, with all iDSP component classes as iDSP-wrapped and scheduled DSP/BIOS II tasks. Multiple instances of a given class are created by OEM software's runtime service request to iDSP.
22. Scheduling is driven by iDSP QoS-optimized interplay between ongoing DSP media operations and real time-based media flow or new service requests from OEM software.
23. iDSP component ("DSP alg") is inside a full object component shell, and an active QoS-maximizing agent under framework's guidance.
24. iDSP component ("DSP alg") does only standards-prescribed media processing. Algorithm's I/O is managed by the iDSP framework, uniformly for all algorithms.
25. Only iDSP framework manipulates iDSP components, with a goal to maximize QoS provided by integral platform. OEM software can only issue iDSP service requests.
26. iDSP framework has a built-in support for adding new types of algorithms, with assured automatic compatibility QA by (e.g., XDAIS-compliant) extending of media object component formats.
27. Using the Connect service request, OEM software can link iDSP components into directed non-cyclical graphs (simplest example is chains), with automatic compatibility QA inside iDSP using object component formats.
28. iDSP framework has audio-video sync support for situations when there is no media player in OEM software. When starting the second of the two (audio+video) streams, OEM software using iDSP synchronizes up with the first one. Start of both streams can be delayed and/or tied to a specific "start now in sync (both already booked)" to make sure delay in processing the second start does not prevent iDSP delivery sync with mutual inter-sample temporal deviation smaller than the prescribed one.

4. QoS Timing Management

The Quality of Service (QoS) manager in the iDSP system, hereby referred to as iDSP-QoSM, is a mechanism to provide negotiated levels of service to client applications. It provides for a guaranteed quality-of-service with a pre-determined degradation policy that is communicated to the clients. The iDSP-QoSM has the following characteristics: (1) It is defined within the limited context of streaming media processing. (2) It is defined for multi-processor environments with load-sharing capabilities, although the preferred embodiment illustrated in FIGS. 1a–1c has only a single DSP (server).

The functions performed by the iDSP-QoSM generally include the following: (1) Monitor the steady-state processing load on the servers (DSPs) in the system. (2) Distribute load from an overloaded server to its peers. (3) Negotiate service requirements with the client application for registering any additional load onto the servers. (4) Predict future load on the servers based on specific characteristics of individual objects being serviced by the servers. (5) Algorithm run time prediction will be based on cycles of processor time instead of time to process: This way the algorithm run time prediction is not tied to the processor operating frequency.

In Texas Instruments TMS320C62XX DSPs there is a limited amount of internal (on-chip) data memory. With the exception of the TMS320C6211 (and its derivatives), the TMS320C62XX DSPs do not have a Data Cache to make external memory (Off-chip) accesses efficient. Internal memory is at the highest level in the Data memory hierarchy of a TMS320C62XX DSP. Therefore all algorithms that run on a TMS320C62XX DSP want to use internal memory for their data workspace because that is the highest level of efficiency for accessing data memory.

Typically, algorithms for DSPs are developed assuming that they own the entire DSP processor, hence all the internal memory of the DSP. This makes integrating several different algorithms, be they the same (Homogeneous) or different (Heterogeneous), extremely difficult. A set of rules is required for the algorithm developer concerning a common method of accessing and using system resources such as internal memory.

The preferred embodiments provide a method to increase Processor Utilization when running multiple Algorithms on Data Cache-less DSPs by using a Data Paging Architecture for DSP internal memory. Developing or converting DSP Algorithms to be compliant to with a Data Paging architecture can be accomplished with Texas Instruments XDAIS standard. This standard requires the Algorithm developer to define at least one or more memory regions that will support all the data memory for the algorithm. Among these user defined regions one or all are selected to run in internal memory of a TMS320C62X DSP by the Algorithm developer. Within the DSP system software portion of the application the internal memory is divided into system support and a data workspace (page). All the algorithms within the DSP application share the workspace and own the entire workspace at execution time. On a context switch between two algorithms the DSP system software will handle respectively the transfer between the workspace and the external shadow memory of each algorithm. The preferred embodiments provide:

(1) Sharing internal data memory in data cache-less DSP between two or more DSP algorithms increases processor utilization.

(2) Running multiple algorithms from the same shared internal memory allows each algorithm to enjoy the maximum efficiency in the TMS320C62X DSP environment when accessing data memory to support stack requirements and algorithm internal variables.

(3) This architecture would function on any single processor with internal memory and a DMA utility that has access to the internal memory of the processor.

(4) Performing Context switches only at data input frame boundaries provides the best efficiency of the data paging architecture.

Supports asymmetric page transfers of algorithm data that is read only.

The data flow in an application may be from algorithm to algorithm, and the preferred embodiments provide for the data to remain in one or more DSPs rather than being bussed to an from a GPP for each algorithm execution.

5. QoS for Multiple Servers

A preferred embodiment configuration in which the iDSP Quality of Service Manager (iDSP-QoSM) is defined consists of a host processor with a pool of Digital Signal Processors (DSPs) as peer servers. An umbrella QoS-manager that performs all functions necessary for maintaining a specific quality of service manages this pool of DSP servers. The host processor is a general-purpose processor (GPP), which is connected to the DSPs through a hardware interface such as shared memory or a bus type interface. The QoS manager may be part of a iDSP or, more generally, a separate manager on the DSPs. The system is driven both by hardware and software interrupts. The preferred implementation is to let the main user (client) application run on the GPP and specific services run on the DSPs on a load-sharing basis. Running concurrently with the QoS manager, on all processors, may be a framework such as the iDSP Media Framework. The iDSP-QoS manager performs three main functions: (1) classification of objects, (2) scheduling of objects, and (3) prediction of execution times of objects.

These functions will be described below, in a GPP/multi-DSP environment, using a media specific example.

a. Classification of objects

In a media specific environment, the object translates to a media codec/filter (algorithm). Media objects can be classified based on their stream type, application type or algorithm type. Depending on the type of the algorithm the QoS managers defines metrics known as Codec-cycles, Filter-Cycles etc.

b. Scheduling of objects (Hard-deadlines)

The iDSP-QoSM schedules the algorithm objects based on a two-phase scheduler. The first phase is a high-level scheduler that determines if a new media stream is schedulable on the DSP and sets hard-real time deadlines for Codec-cycles. The second phase schedules individual media frames and makes use of the hard real-time deadlines from the first phase. The first phase runs at object negotiation time and typically on the host (GPP). The second phase would run on the DSPs (servers) and runs on a per frame basis.

The first phase of scheduling is when the QoS manager determines on average if the object can be supported with already concurrently running objects. Also required as part of the first phase scheduling is consideration of sufficient support for the object in terms of memory. The object memory buffers for internal usage, input and output, must be fixed statically at the time of its instantiation to remove the uncertainty of allocating memory dynamically. The iDSP Media platform only runs XDAIS compliant algorithms. The developers are required to define the processing times under different conditions for their algorithms. The approximate times required for data transport to and from the servers are determined at the time of initialization which is factored in by the QoS manager when it sets deadlines for each object.

Each DSP object is required to supply the following information to the QoS Manager:

n Codec-cycle and Number of Frames (Default: frames/second)

$T_{acc}$ Average time to compute a Codec-cycle in number of target server (DSP)cycles.

$T_{acd}$ Display time of a Codec-cycle in number of target server (DSP) cycles.

For a video codec, n will usually be the number of frames between successive I-Frames (e.g. 15 frames). And $T_{acc}$ will usually be the sum of the maximum amount of time required for an I-Frame plus the average time required for the P and B frames. The QoS Manager keeps track of the $T_{ccd}$ for all media objects. This time (in terms of DSP cycles) is based on the current frame rate. For example, for a 30 fps video stream and n=15, let $T_{ccd}$=125 Mcycles.

The QoS Manager can now determine if a new stream is schedulable as follows. Let S be the sum of the Codec-cycles ($T_{acc}$) for all streams currently scheduled. If (S+$T_{acc}$) for the new stream is less than the $T_{ccd}$ for the new stream, the stream is schedulable, otherwise it is not. For example, assume there is an Object-A with n=15, $T_{axc}$=39.5 Mcycles (158 ms), and $T_{ccd}$=125 Mcycles (500 ms), and there are no tasks scheduled on the DSP (so S=0). The QoS Manager is notified to schedule resources for a new stream that requires Object-A. Because S+39.5=39.5 Mcycles<125 Mcycles (500 ms), we can schedule the stream. When a second stream comes along requiring Object-A, it is also scheduled because S+39.5=79 Mcycles (316 ms)<125 Mcycles (500 ms). A third stream can also be scheduled. A fourth stream, however, can not be scheduled because that requires 158 Mcycles (632 ms), so we can not meet the 500 ms hard deadline. At this point the QoS Manager negotiates to reduce the frame rate of a stream and, failing that, will reject the stream altogether.

A modification allows the scheduler to handle heterogeneous media objects with differing Codec-cycle times. Objects with longer $T_{ccd}$ are prorated to the smallest $T_{ccd}$. For example, assume there is an Object-B with n=30, $T_{axc}$=40 Mcycles (160 ms), and $T_{ccd}$=169 Mcycles (675 ms), and there are two Object-A objects (as defined above) scheduled on the DSP (so S=79 Mcycles/316 ms). We can schedule the new Object-B stream because S+40*(125/158) =110.45 Mcycles (S+160*500/675=435 ms). This is provably correct since (79+40<125) Mcycles/(316+160<500)ms, so we can actually guarantee all the streams within the shorter Codec-cycle deadline of 500 ms. What happens when a second stream requiring Object-B needs scheduling? 110.45+40*125/158=139>125 M cycles/435+160*(500/675)=554 ms>500 ms. Therefore, the scheduler rejects this stream and begins negotiating as mentioned above.

The iDSP-QoSM will negotiate with the application or its proxy to reserve sufficient processing bandwidth for a media object based on the Codec-cycle. This negotiation will take into account an object's required memory, requested QoS level and available MIPS of the DSP with other running concurrent DSP applications. As the object selection changes, the QoS manager will perform a renegotiation of DSP processor bandwidth. Input parameters to the negotiation process of the QoS manager require the application to define the following for an object:

(1) DSP memory requirements (Number and size of input/output buffers)

(2) Desired QoS level (typically expressed in Frames per second)

(3) Worst case runtime for starting the object.

(4) Has hard real-time deadlines for sequences of media frames, called Codec-cycles (number of frames and average execution time).

Figure 3:
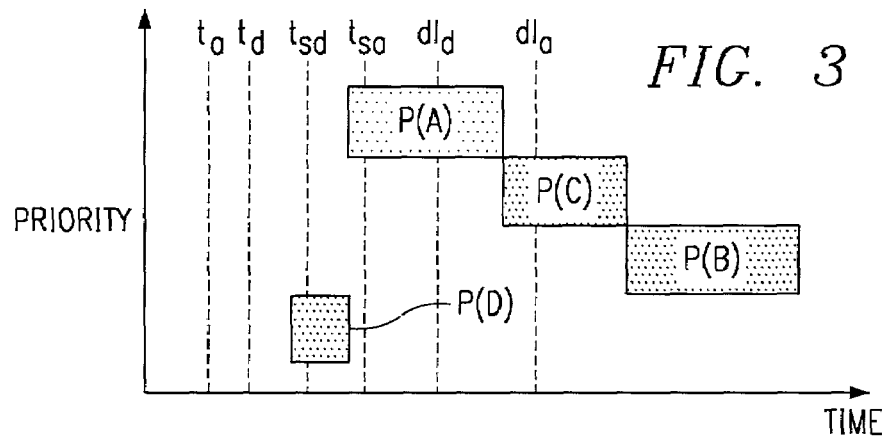

The second phase scheduling of objects in the iDSP-QoS manager is based on two aspects, whose deadline comes first as and who has the higher priority. Consider the following example, if Object-A has a deadline at 10 ms and Object-D has a deadline at 3 ms the iDSP QoS manager will schedule Object-D to run first even though Object-A is of a higher priority. Since we know the approximate runtimes of the objects we can determine the "No Later" time when an object must be started so that it still meets its deadline. In FIG. 3 it is predicted that Object-D will finish before the "No Later" start point for Object-A. In this scenario there is not a deadline conflict between the higher priority Object-A and Object-D. Therefore Object-A runs after the lower priority Object-D.

Figure 4:
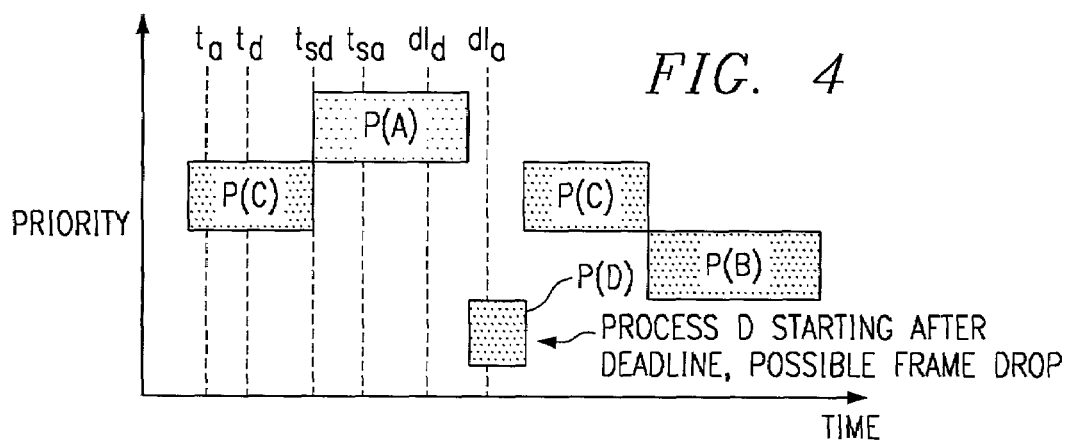

In another scheduling example where priority would weigh in over first deadline is if the "No Later" time of the higher priority Object-A is before the predicted finish-time of Object-D predicted. In this case Object-A would run first since it is higher priority and Object-D would be allowed to run after, further only if Object-D meets its frame dropping parameters specified at object instantiation time; see FIG. 4.

For the iDSP QoS to manage the deadlines to the best possible efficiency, the GPP must let the data input frames to the DSP subsystem as soon as possible to allow the maximum amount of time between arrival time and deadline for an object. The greater the time for a data frame between its arrival and its deadline allows the iDSP-QoSM more flexibility in the scheduling of the respective objects with other concurrent objects.

c. Runtime Prediction of Objects (Soft-deadlines)

The central function of the iDSP-QoSM is to predict the required processing times for the next input frames of all scheduled objects. This prediction is non-trivial and unique to an object. The QoS manager predicts the runtime for an object by using the statistics of previous run times to calculate the expected run time for the next input frame. The expected runtime for an object is a function (unique to an object) of previous runtimes with a maximum possible positive change (also determined uniquely for each object). For instance, in the case of video objects, the periodicity of I, P and B frames are deterministic. Hence, future processing times can be predicted based on the type of present frame and its location within the periodicity of the video frames. Such predictions performed on all concurrent alogrithms directly helps in dynamically re-allocating priorities based on the predicted processing times and approaching hard deadlines.

These predictions are the key enablers for managing soft-deadlines and jitters in processing times. The iDSP-QoSM, based on the predictions, will instantaneously reschedule the objects for processing. This instantaneous rescheduling occurs within the Codec-cycle deadline times (hard-deadlines defined on an average) of individual objects. This method is unique in the sense that individual frames are weighted according to both hard and soft deadlines. In the example above we assumed that all frames in Object-B required the same amount of time when we averaged the workload for the 500 ms overlap with Object-A. This may not be true as the frames for Object-B may require more time during the actual overlap or Object-B may not be given the average amount of time. Therefore, frames closest to their Codec-cycle deadline receive a higher priority.

If the predicted runtime violates the user-defined time requirements the QoS manager will take one of several possible actions.

In a Single DSP Configuration (level 1) A simple binary cut off: This results in an automatic frame-drop. The object in question should be capable of indicating if frame drops will cause catastrophic results.

(level 2) A general reduction in allotted runtime of lower priority objects with a pre-emption of the object at the end of the allocated time. This may or may not result in a frame-drop.

(level 3) Objects are required to have the ability to accept QoS commands such as scaling back quality of the output data.

In a Multiple DSP Configuration (1) At the end of each QoS time-slice, messages with load-data are sent from each DSP to the GPP.

(2) The GPP resorts to a redistribution of objects ONLY in the case of an estimated dead-line miss. This re-allocation of tasks is to be performed by the GPP (ORB layer) after receiving the "load-data" from the serving DSPs. However, to reduce task switching time, it is VERY DESIRABLE that all DSPs operate from a common cluster of external memory space.

All objects executing in the iDSP system have to be deterministic in execution times. DSP objects can be broken down into three types, compressing of data (encoding), de-compressing of data (decoding) and data conversion (pre or post processing of data for objects). The objects are presented data in blocks to process; these blocks are called input data frames. The objects process an input data frame and generate an output data frame. As with any computational data, both input and output data frames are bounded in terms of size and the amount of processing. Based on the size of any given input frame there can be a precise determination of the maximum amount of processing that a DSP, or any other computer for that matter, will have to perform on that input frame.

Each object, before it is integrated into the iDSP system, is required to declare the worst case run time for that object for a single frame. This worst case run time is used to calculate the run time of the first input data frame so the object can be started. The QoS manager is not able to characterize the input data frame before the object is run. Since encoder and decoder objects rarely run in worst case scenarios the first input frame will be costly (since it has to be predicted to be worst case). This worst case schedule is likely to cause a greater than actual runtime for the first frame. This is only a problem if the actual runtime is greater than the worst case schedule.

Figure 5:
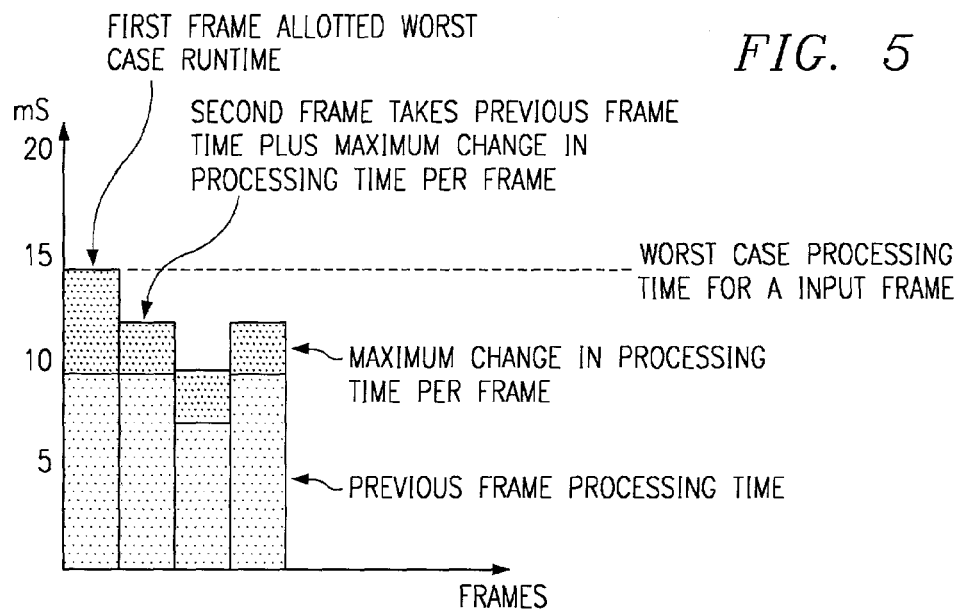
Figure 6:
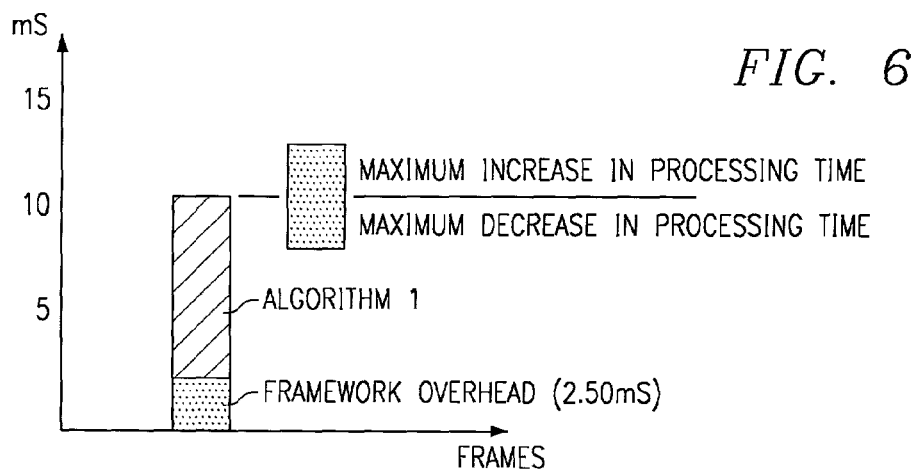

As stated earlier, the processing time of an algorithm object will vary between input frames. At the outset, the iDSP-QoSM will start with the worst case value for the first data input frame. After the first frame, the QoS manager will predict the processing time for the next input frame based on the characteristics of the algorithm and the measured processing time for the first frame. For each subsequent frame, the it predicts an approximate processing time, based on the semantics and the history of the algorithm object. For example, encoder objects use the object semantics (e.g., I, P, and B frame types) along with the average encoding time of the previous similar input frames for predicting future encoding time requirements. Encoder objects work on the same size input frame each time they are scheduled for execution. The variations in processing times come from factors like the activity level in the frame, degrees of motion between frames etc. These variations, however are bounded. Hence, the processing time between two frames will have a finite maximum difference which can be added to the predicted processing time to determine the worst case processing time for the next frame. See FIGS. 5–6.

Figure 7:
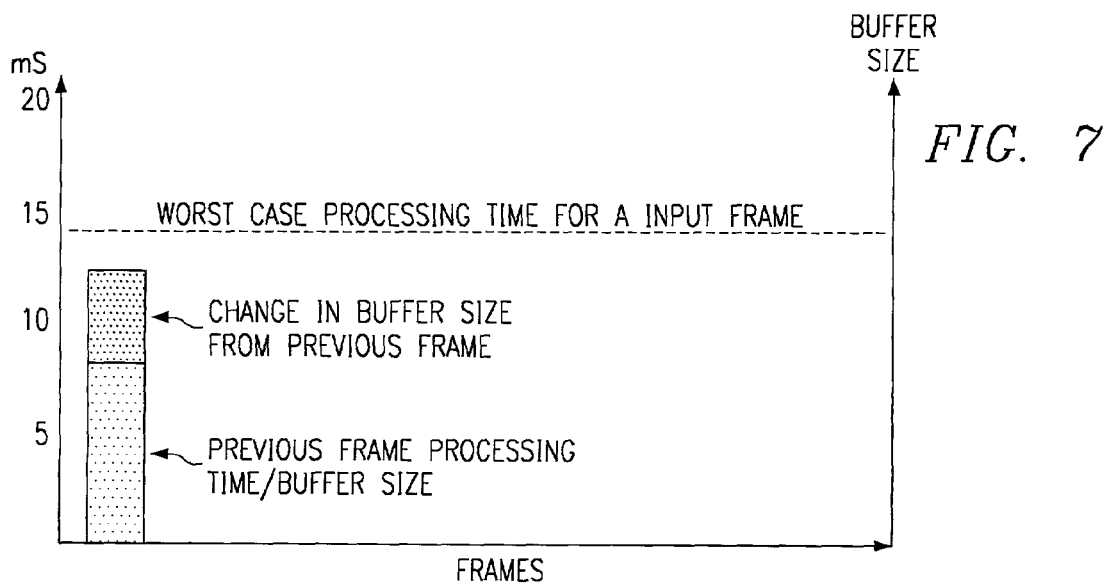

Decoding objects are typically presented variable sized input frames. The processing time of an input data frame is directly proportional to its size. To determine if there will be an increase in the next frame processing time, the QoS manager will check the magnitude of difference in the present and the next data input frame sizes. A similar argument, as with the encoder, also holds for the decoder i.e, the difference in the processing between two semantically similar frames is bounded. The maximum or worst case processing time for a decoder is the largest possible buffer that is defined for the object. See FIG. 7.

Conversion objects run similar to encoder objects in that they always work on the same size input frames. Each frame always takes the same amount of processing time and is a single pass through the input frame. Therefore the processing time per input frame will always remain constant.

Each object will receive from the user application a relative time in which the passed frame must be completed by the object. An example would be that the application specifies that this frame must be processed in the next 7 mS. Since there is no common software clock between the host GPP and the DSP deadlines can only be specified in relative terms. We assume transport time of data frames between the host and the DSP to be deterministic. The iDSP system keeps an internal clock against which the data frame receives a timestamp upon arrival and then calculates the expected processing time. After computing the expected processing time the QoS manager now schedules the data frame execution.

Before an object can be scheduled, the QoS manager determines the appropriate order of execution of the object compared against other concurrent objects. If there are no other objects processing input frames, the object frame is immediately scheduled for execution. If there are other objects running, the QoS manager determines execution order by considering the priority, expected deadlines and hard or soft real time requirements of each requested object. See FIG. 8.

When multiple objects, with different runtime priorities, are combined onto the same DSP, the QoS manager will compute a runtime prediction for each object based on the object's specific runtime calculation. It then schedules different tasks based on a scheduling object (TBD). The following three scheduling scenarios are possible:

(1) All the objects run to completion on the input data frames given and complete within the application-specified deadline. This scenario is presented in FIG. 9, notice that all the objects in the picture complete before each object deadline. If all objects complete before their respective deadlines, work required of the QoS manager is minimal.

(2) The processing load increases on one or more objects (ex: Object-B), but, this does NOT CAUSE the prediction deadlines for following objects to be missed. It is possible for the load to increase on one or more objects such as in Object-B. Depending on the object, missing a deadline may be acceptable if subsequent data frames of the same object are processed within their deadline restriction. An example would be in a H263 encoder where an "I" frame takes the longest to compute. The frame following the "I" frame is always a "P" frame and typically has a lot smaller processing requirements. This allows the "I" frame processing to cycle steal from the following P frame processing. Thus, missing the deadline on one frame may not be catastrophic if there is sufficient processing room on the next frame.

Since the deadline for Object-B has been exceeded, the overall system effect has to be determined. If the missing of deadline by Object-B does not cause the prediction deadlines for following objects to be missed then the overall system hazard is minimal. See FIGS. 10–11.

Figure 12:
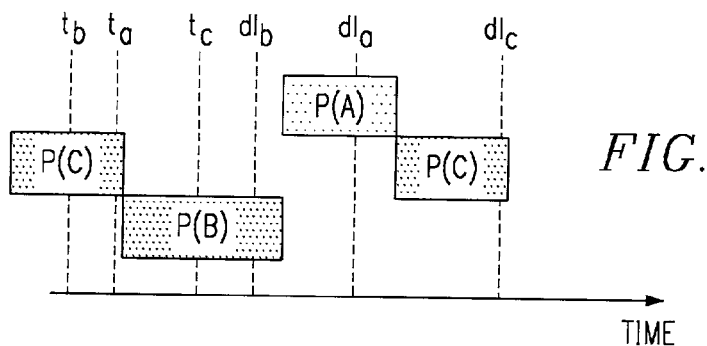

(3) The processing load increases on one or more objects (Ex: Object-B), but, this CAUSES the prediction deadlines for following objects to be missed. See FIG. 12.

In this case, the missing of deadline by Object-B causes the prediction deadlines for following objects to be missed. Even in this case, the overall system hazard may or may not be minimal. Each of the concurrently running objects might be able to steal cycles from subsequent frames and hence avoid a domino-effect of missed deadlines.

The iDSP-QoSM proposes a set of rules for soft-deadline management. This set of rules is designed to limit a snowballing effect of missed deadlines resulting from a single critical missed deadline. (1) Every algorithm object provides the QoS manager a maximum number of frame-drops/second allowed. (2) Each object updates a running count of the number of 'missed deadlines' as a moving average after each processing cycle. (3) When an object exceeds its limit of missed deadlines, change the priority of the object to the highest value. Original priority is restored once the number drops below the limit. (4) All subsequent frames that miss their deadline after the limit, are dropped. This results in a temporary lowering of the QoS to the next immediate level. This instantaneous drop in QoS (should be extremely rare) is then reported to the client. (5) Frames are dropped as a rule, ONLY if the DSP has not even started the object in question even after the passage of its deadline.

d. Throttle control for periodic media rendering

For a given algorithm object, the iDSP-QoSM assumes that there is only one request in the ready queue at any instant. Media streams, in general, have periodic deadlines (e.g., 30 frames/sec for video streams) specified as quality of service constraints to the QoS manager. Audio and video rendering components in a media system can buffer frames to handle variances in arrival times, allowing frames to arrive slightly ahead of schedule. But these buffers are finite and so the upstream components of a media system must carefully throttle the relative speeds at which frames are processed.

Two mechanisms are provided by the iDSP-QoSM for throttling the processing speeds of algorithm objects.

Figure 13A:
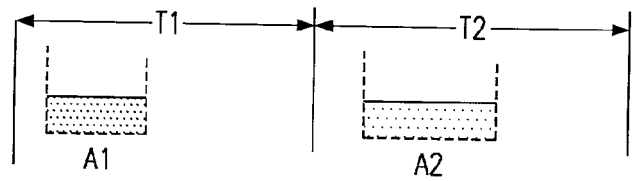

(1) The client of the DSP algorithm object controls the speed at which it invokes the processing function (server) of the algorithm object. This can result in sub-optimal behavior of the QoS manager's scheduling algorithm if the requests are made within the time period they must be fulfilled. For example, consider algorithm object A above in which buffer Al must be processed within time period T1 and buffer A2 must be processed within time period T2. FIG. where T1 and T2 are two successive periods, [x] indicates arrival of buffer x, {x} indicates completion of processing of buffer x. See FIG. 13a.

Figure 13B:
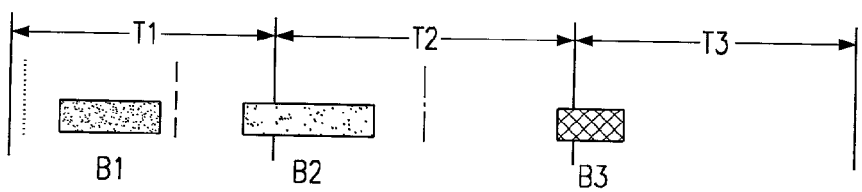

(2) The QoS Manager controls the throttling of the media stream. This mechanism allows the client to invoke an algorithm object's processing function, with an input buffer, as soon as possible. The QoS manager will then append a 'start-deadline' to the input buffer. The scheduler does NOT schedule this buffer until after the 'start deadline'. The client blocks until the processing of its present buffer is completed. See FIG. 13b.

Thus, in both cases, there is at most one request per algorithm object, in the QoS manager ready queue at any instant.

Memory Paging

To best run multiple algorithms on a DSP, or any processor for that matter, a set of rules must be established so that system resources are shared fairly among the algorithms.

These rules specify access to peripherals of the processor such as DMA, internal memory and scheduling methods for the algorithms. Once a set of rules has been accepted a system interface can be developed for the algorithms to plug into so that they can access system resources. A common system interface provides the algorithm developer well defined bounds in which to develop algorithms sooner since they can concentrate solely on the algorithm development and not system support issues. Such an interface is the Texas Instruments iDSP Media Platform DSP framework. All access between an algorithm and a TMS320C62XX DSP occur through this framework.

The Texas Instruments XDAIS standard requirement establishes rules that allow the plug-ability of more than one algorithm into the iDSP Media Platform ". . . allows system integrators to quickly assemble production quality systems from one or more algorithms." The XDAIS standard requires that the algorithm meet a common interface requirement called the Alg interface. There are several rules imposed by the XDAIS standard, most significant is that the algorithm cannot directly define memory or directly access hardware peripherals. System services are provided through the single common interface for all algorithms. Therefore the systems integrator only provides a DSP framework that supports the Alg interface to all the algorithms. The Alg interface also provides to the algorithm developers a means of accessing system services and invocation for their algorithm.

An algorithm must exactly define its internal memory requirements. This is a necessity for a paging architecture to support multi-algorithms accessing the same space in internal memory. XDAIS compliant Algorithms are required to specify their internal and external memory requirements.

Figure 14:
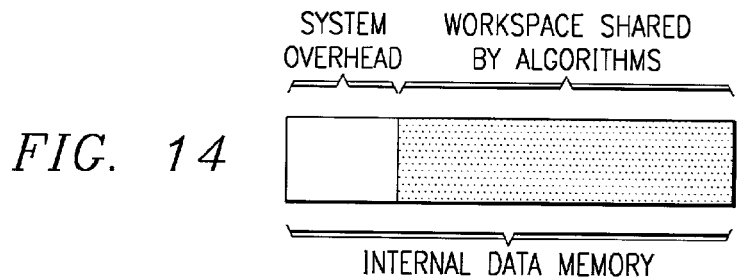

The internal (on-chip) memory has to be divided up into two areas. First is the System overhead area, this is support for the OS data structures for a particular DSP system configuration. The second area is for the algorithms to use but only when they have been scheduled to execute. Both memory areas have to be fixed in size. This second area of memory is called the algorithm on-chip workspace; in other terms this workspace area can also be described as a data overlay or data memory page. See FIG. 14.

To determine how much memory is available for the algorithm on-chip workspace, the system developer takes the total amount of internal data memory space available and subtracts out the amount needed to support system software such as the OS support and data support for the paging architecture. The OS configuration, such as tasks, semaphores, should be set by the system DSP designer to a maximum size that supports the total number of algorithms the designer wants to have running concurrently at one time. This keeps OS support overhead to a minimum and increases the algorithm workspace.

For an algorithm to run in this environment its internal memory requirements must be less than the size of the workspace. Otherwise the system integrator cannot integrate the algorithm; the limitation is that there is only one page per algorithm. This architecture does not support multiple pages for an algorithm.

Figure 15:
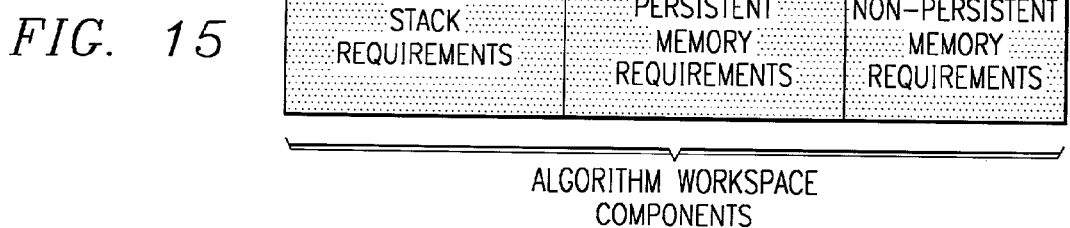

The algorithm workspace is divided into three components, Stack (mandatory), Persistent Memory and Non-Persistent memory. There is sometimes a fourth component that will be discussed later dealing with read only portions of persistent memory. See FIG. 15.

Figure 16:
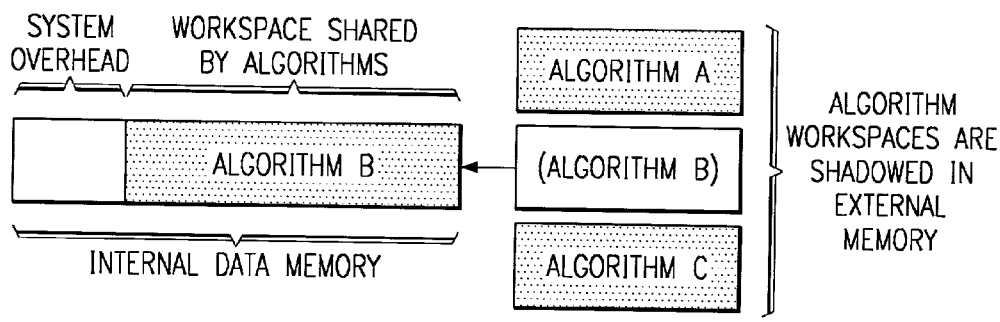

An algorithm only uses the on-chip workspace while it is executing. When an algorithm is scheduled to execute the DSP system software will transfer the algorithm's workspace from its external storage location (shadow storage) into the internal workspace on-chip. When the algorithm yields control, the DSP system software will determine which algorithm to run next, if it is the same algorithm then there is no need to transfer in the workspace. If the next algorithm is a different algorithm then the current workspace is stored in its shadow location in external memory and the next algorithm's workspace is transferred in. See FIG. 16.

The entire workspace for an algorithm is not transferred at context switch time. Only the used portion of the stack and persistent data memory are transferred. The algorithm's stack is at its highest level (least used) when an algorithm is at its highest level in its call stack. In other words the algorithm is at its entry point.

Figure 17:
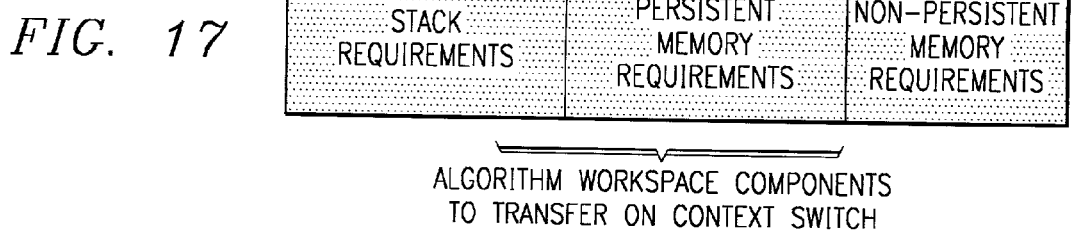

The ideal context switch for an algorithm happens when its stack is at its highest level because that means there is less data to transfer off-chip into shadow storage. See FIG. 17.

The preferred embodiment data page architectures require the context switch to be most efficient. Context switch processing overhead takes away from the time the DSP can execute algorithms. Since the best time to context switch an algorithm is on its call boundary, the pre-empting of algorithms should be absolutely minimized. Pre-empting an algorithm when its stack is greater than its minimum will de-grade the overall system. This should be a requirement, but it might acceptable to pre-empt on a very limited basis. See FIGS. 18–19.

A special case of the algorithm workspace is if the algorithm requires a read only persistent memory. This type of memory is used for look-up tables used by the algorithm. Since this memory is never modified then it only needs to be read in and not written. This asymmetric page transfer decreases the overhead with the context switch of the algorithm.

With this data paging architecture a single algorithm can be instantiated more than once. Since the algorithm has defined what its needs for internal memory requirements, the DSP system integrator can more than one instance of the same algorithm. The DSP system software keeps track of the multiple instances and the when to schedule each instance of an algorithm. The limit of number of instances is how much external memory there is in the DSP system to maintain the shadow version of the algorithm instance.

The DSP system software has to manage each instance so that it is correctly matched to the algorithm data upon scheduling the algorithm. Since most DSP algorithms are instantiated as tasks, the DSP system software could use the task environment pointer as a means to manage the algorithm instances.

Data Flow with Chaining

Figure 21:
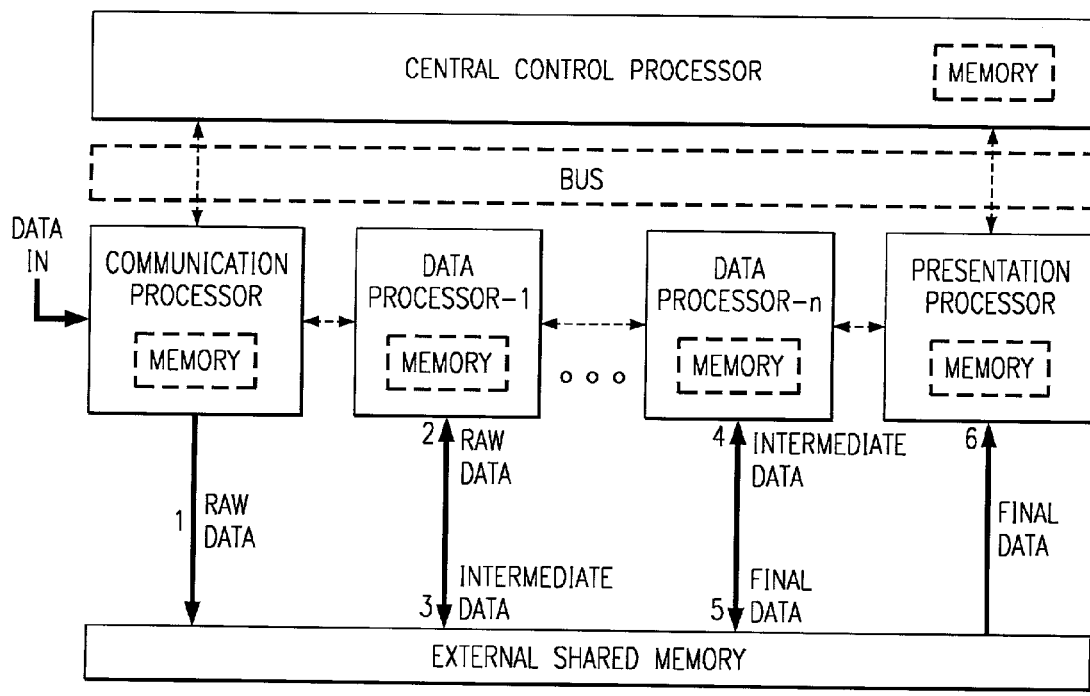
FIGS. 21–23 show preferred embodiment data flows.

The data flow preferred embodiments rely on integrating processing elements, providing them a shared memory space, and routing data directly between processing elements without intervention by the GPP. Such a system is shown in FIG. 21.

When processing element $PE_a$ completes processing a chunk of data it writes the resulting data to a pre-defined output buffer in shared memory. $PE_a$ then notifies the next processing element, $PE_b$ in the chain via the appropriate control path. The notification indicates which shared memory buffer $PE_b$ should use as input. $PE_b$ then reads the data from the input buffer for further processing. In this manner data is passed between all processing elements required until all data has been consumed.

Figure 22:
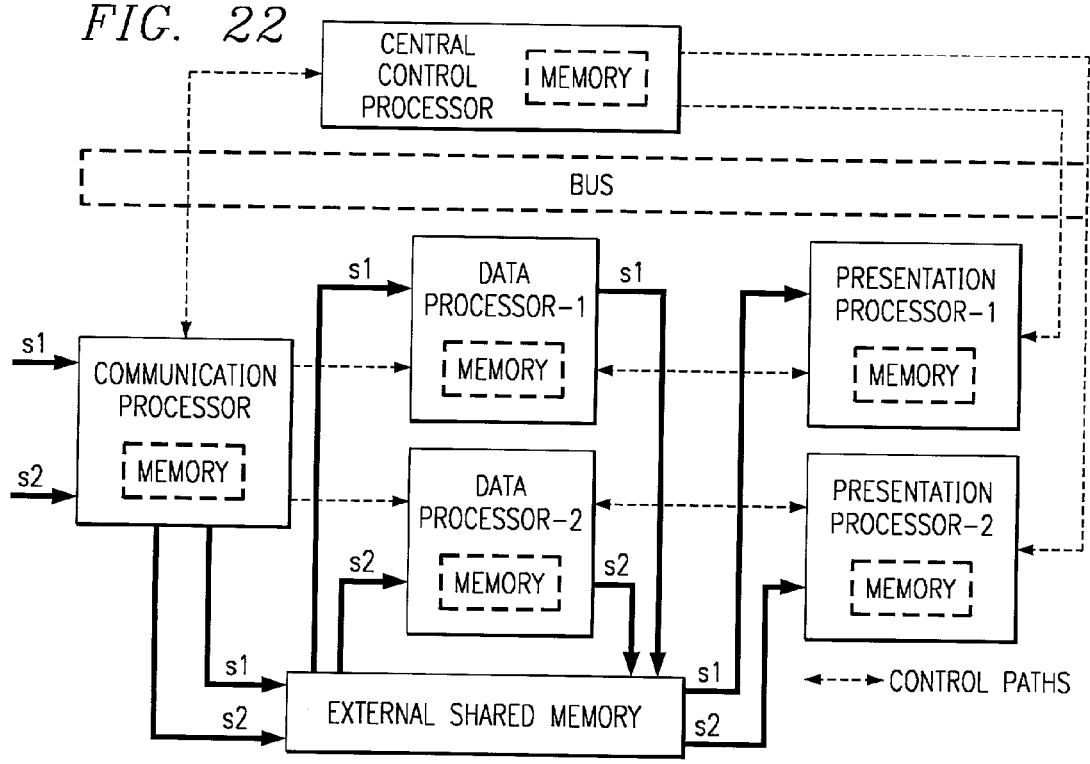

A set of buffers, as described above, is used to communicate data between two processing elements and comprises an I/O channel between those elements. Multiple I/O channels may exist between any two processing elements allowing multiple data streams to be processed simultaneously (i.e. in parallel) by the system. FIG. 22 shows and example of parallel processing of multiple data streams, s1 and s2.

A series of processing elements connected by I/O channels constitutes a channel chain. Several channel chains can be defined within a particular system. In the case of a mid-chain processing element each input channel has an associated output channel. Terminal processing elements have only input or output channels.

A processing element's input channel defines the buffer(s) from which data is to be read. A processing element's output channel defines the buffer(s) to which data is to be written as well as which processing element to notify afterwards. Types of control messages between the data processing elements and the central control processor (CCP) are.

(1) status messages: data stream processing started, stopped, aborted, paused, resumed, etc . . .

(2) quality of service messages: time stamps, system load, resources free/busy, etc . . .

(3) data stream control messages: start, stop, pause, resume, rewind, etc . . .

(4) system load messages: tasks running, number of active channels, channels per processing element, etc . . .

In one preferred embodiment, the creation and association of I/O channels with processing elements is defined statically via a configuration file which can be read at system initialization time. For each bitstream type to be processed, the configuration file defines a channel chain (i.e. data path) connecting the appropriate processing elements. The collective processing of all processing elements in a channel chain results in complete consumption of the data.

In the case where multiple data paths exist for a given bitstream, alternate or backup channel chains could be defined. Bitstreams could be routed to these in case of unavailability of any processing element of a primary channel chain. Determination of the bitstream type at runtime and dynamic QoS analysis selects the channel chain through which the data is routed. At runtime all legal channel chains in the system are fixed and unmodifiable.

In another preferred embodiment, channel chains for different bitstreams could be constructed dynamically when a new bitstream arrives at the communication processor. Bitstream information derived at runtime would be sent via control message(s) to the CCP which would determine the processing elements required and dynamically allocate I/O channels between them. This approach would allow resources to be taken out of service or brought online at runtime allowing the system to adapt automatically.

In the shared memory heterogeneous system, data flows between the processing elements via the external shared memory without intervention by the CCP. Data never appears on the bus so the speed of a data transaction is determined by shared memory access time rather than bus transport time. Since CCP intervention is also minimized, CCP response and processing delays are eliminated from the overall data flow time. This enhances the throughput of the system by minimizing data transfer time between processing elements.

a. An example

Figure 23:
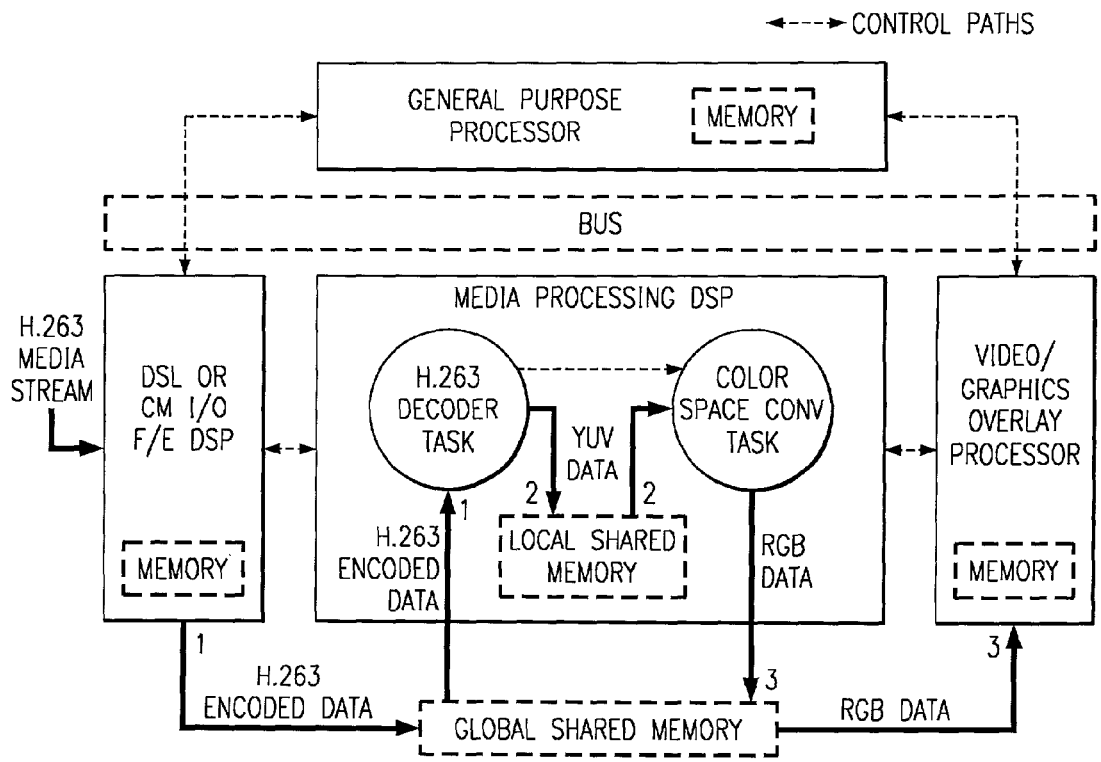
Figure 24:
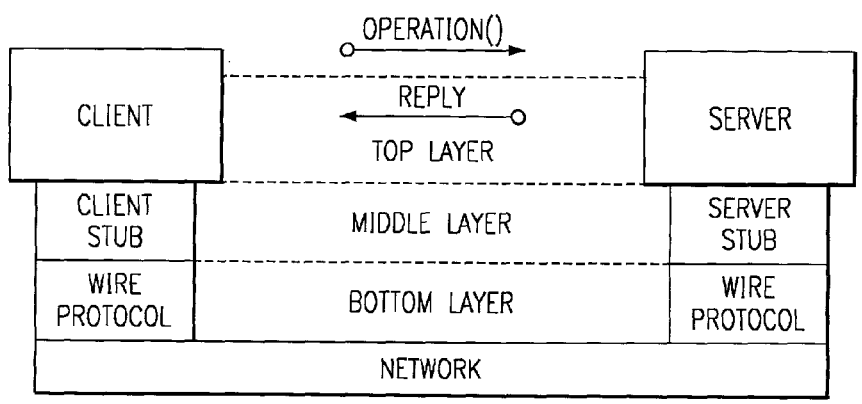
FIGS. 24–25 illustrate client-server and MPEG-21 systems.
Figure 25:
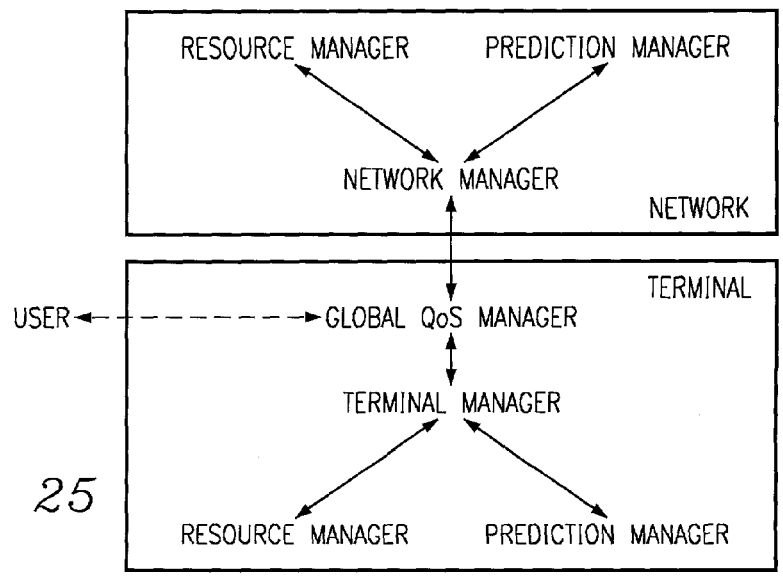
Figure 26:
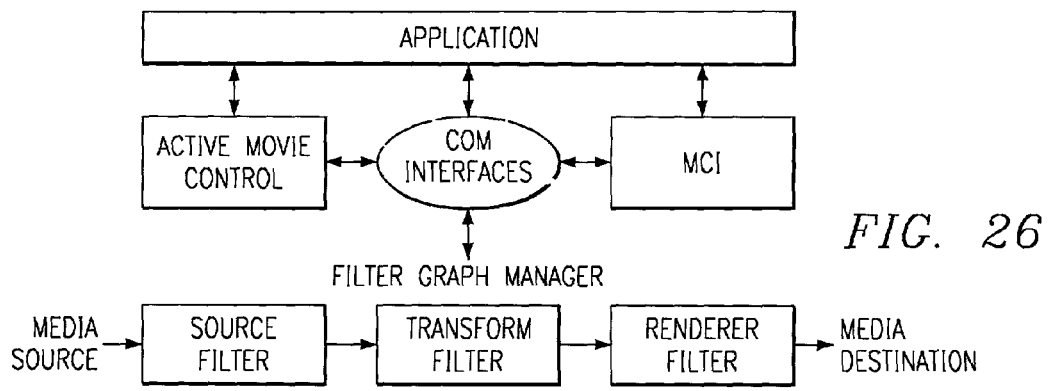
FIGS. 26–28 illustrate Direct Show filters and application control.
Figure 27:
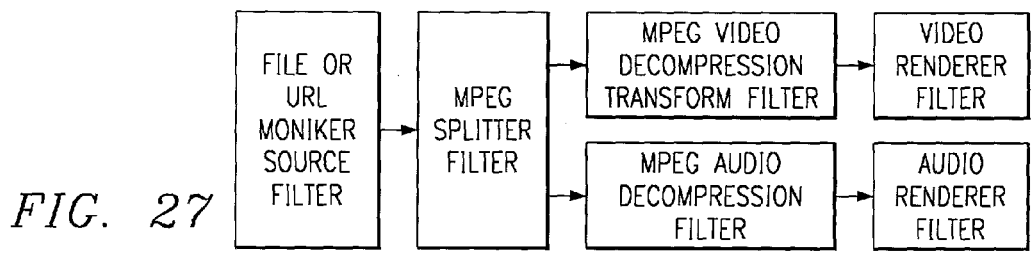
Figure 28:
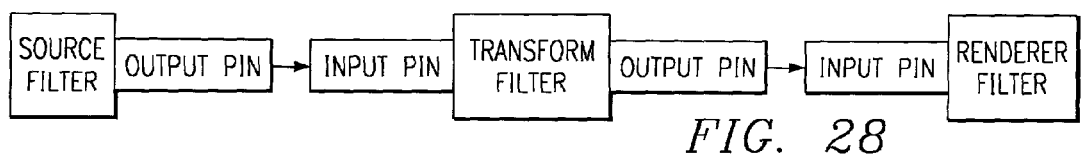

A typical application of the data flow techniques discussed herein would be for media processing systems. Such a system would initiate and control streams of broadband media for processing such as decoding, encoding, translating, converting, scaling, etc. It would be able to process media streams originating from local disk or from a remote machine/server via communication mediums such as cable modem, DSL, or wireless. FIG. 23 shows an example of such a system.

The media processing system of FIG. 23 contains five processing elements:

(1) DSL or Cable Modem I/O front-end DSP
(2) media processing DSP
(3) video/graphics overlay processor
(4) H.263 decoder task
(5) color space converter task The H.263 stream entering the front-end I/O DSP follows a channel chain defined by numbered arcs 1 through 3. Each channel connects 2 processing elements and is composed of a set of I/O buffers used to pass data between the elements. Control flow is shown via the shaded arcs.

The H.263 stream flows from the I/O front-end DSP into a channel 1 I/O buffer defined in global shared memory. The I/O front-end DSP notifies the destination processing element associated with channel 1, i.e. the H.263 decoder task on the media processing DSP, that its input buffer is full and ready to be read. The H.263 decoder task reads from the channel 1 I/O buffer, decodes the data and writes the resulting YUV data to the channel 2 I/O buffer in local shared memory.

Note that channels can be inter-processor or intra-processor. Data can pass between processors via global shared memory (inter-processor) or via shared memory "local" to a given processor (intra-processor). In FIG. 23, channels 1 and 3 are inter-processor and channel 2 is intra-processor.

What is claimed is:

1. A framework for real-time media applications on an applications processor in communication with an algorithm processor, comprising:
   (a) a plurality of plugins for a real-time media application on an applications processor;
   (b) a plurality of first algorithm components on an algorithm processor, each of said plugins corresponding to one or more algorithm component(s), and said algorithm processor in communication with said applications processor;
   (c) a component scheduler on said algorithm processor;
   (d) wherein said component scheduler provides quality of service for said application with regard to said components by: (i) component scheduling in response to controls from said plugins relating to execution of said components and (ii) notification of events related to execution of said components sent to said plugins; and
   (e) an applications processor scheduler to determine deadlines for a media stream that can be scheduled on said algorithm processor, and wherein said component scheduler on said algorithm processor schedules a frame at a time of said media stream.

2. The framework of claim 1, wherein:
said controls include a set of data rate for one of said components.

3. The framework of claim 1, wherein:
said events include notice of failure of meeting a presentation time for one of said components.

4. The framework of claim 1, further comprising:
a plurality of second algorithm components on a second algorithm processor, with said second algorithm processor in communication with said applications processor and said algorithm processor and said plugins also relate to said second algorithm components.

* * * * *